Patented Aug. 13, 1940

2,211,541

UNITED STATES PATENT OFFICE 2,211,541

TANNING

Willy Günther, Port-au-Prince, Haiti

No Drawing. Application October 14, 1938,
Serial No. 234,892

4 Claims. (Cl. 149—5)

The present invention relates to an improvement in tanning and is particularly directed to the manufacture and use of a new tanning agent comprising a superoxidized iron salt.

One of the objects of the present invention is to produce a tanning salt, starting with ferrous sulfate, which is dehydrated and superoxidized by means of heat and irradiation of ultraviolet light.

A further object of the invention is the tanning of skins and pelts by means of this specially prepared iron salt, with or without additional tanning agents and manipulative steps as hereinafter more fully described.

It has been proposed in the past to employ iron salts for the purpose of modifying skins and hides in order to effect their tanning and general improvement; for example, salts of iron, particularly in the ferric condition, have been employed, usually in combination with extraneous oxidizing agents or acids, or both. For instance, combinations of ferric sulfate, sodium nitrate, sulfuric acid, nitric acid, bleaching powder, bichromates, and the like, have been used; or iron sulfate, sodium nitrate, and sulfuric acid have been employed. In some cases oxides of nitrogen, for example $NO_2$, have been employed to effect the oxidation of the iron while in solution. Other proposals have involved the use of ferrous sulfate together with potassium nitrate and potassium bichromate, or else the ferrous salt has been used in solution, its oxidation being effected by bubbling air or oxygen through the solution. All of these prior art methods, however, suffer from one very great defect, and that is the tendency of such solutions, because of their acid reaction, to embrittle the leather and cause it to lose a considerable amount of its strength. The present process is therefore to be differentiated from the prior art in that it employs as a tanning agent a basic superoxidized ferric sulfate, having the approximate formula $Fe_2S_2O_9$, without the necessity of using in connection therewith acids or oxidizing agents which tend to deteriorate the pelts or hides upon which the material is used.

As raw material for the manufacture of the improved tanning agent which is the subject of the present invention, iron sulfate in ferrous condition is employed. This iron sulfate, known as ferrous sulfate, has the formula $FeSO_4.7H_2O$. This product is first pulverized, and in the pulverulent condition is dried in the air at a temperature of about 40° C., as a result of which 6 molecules of water are driven therefrom, the salt thus being converted into a whitish powder having the formula $FeSO_4.H_2O$. In order to produce the salt of the present invention, it is necessary not only to remove the last molecule of water but also to superoxidize the salt, this being accomplished by heating the $FeSO_4.H_2O$ to a temperature of at least 50° C. in the presence of oxygen or air while at the same time irradiating the powder by means of ultraviolet light. The latter may be accomplished by carrying out the drying in the open sunlight in those parts of the world where there is a high percentage of ultraviolet radiation, as for example on high mountains or in the tropics, or by artificially developed ultraviolet rays, as for example those from an arc light, ultraviolet mercury vapor lamp, or other suitable source of ultraviolet radiation. The irradiation and heating should be carried out for a period of from 3 to 4 hours in order to insure a complete oxidation of the iron to the ferric condition and the incorporation into the salt of as much oxygen as possible. The formula of the product obtained is believed to be $Fe_2S_2O_9$.

It will be noted that no foreign material is added to the iron salt and that its conversion into the superoxidized condition is effected merely by heat, oxygen and the energy input of the ultraviolet rays. The product thus obtained forms one of the objects of the present invention.

The superoxidized basic ferric sulfate, $Fe_2S_2O_9$, may be used either alone as a tanning agent or in combination with other materials. The product is soluble in cold water and presents the following advantages when employed as a tanning agent: It saves time and tanning materials, produces thorough and complete tanning with resultant even, light color of the leather, high strength, flexibility, and other valuable properties. It may be employed for the tanning of heavy leather, pelts, sole leathers, and upper leathers; and it may be applied with equal success to the skins or hides of animals, reptiles and fish, and to furs, etc. Inasmuch as in tanning with this new superoxidized basic iron salt no inorganic acids are used, all the desirable properties and the strength of the leather are maintained, which is of particular advantage when subsequently storing the tanned leather.

There will now be given a number of specific examples of the manner of tanning when using the new salt:

Ex. 1—For General Tanning

(a) Of upper leather

The skins or pelts must be completely delimed prior to the tanning. The pelts are treated with 1% of salt (NaCl) and 2% of aluminum sulfate $(Al_2(SO_4)_3.18H_2O)$ in the usual way. There is then prepared a solution of from 8% to 12% of the superoxidized iron salt of the present invention, this percentage being based upon the weight of the pelts, the solution being made with double the quantity of cold water, with the further addition of from ½% to 1% of formaldehyde. The solution thus prepared is added in three or four separate increments at intervals of from 20 to 30 minutes to the tumbling barrel or drum in which the tanning is taking place. The tanning solution at the end of this addition has a gravity of about 8° Bé. The tanning is continued from 3 to 5 hours, depending upon the thickness of the skin. When the tanning is completed, the leather will be found to have a light yellow color and a yellow cut. The leather is then removed from the tanning solution and washed in running water for about 20 minutes, whereafter it is treated with a 3% solution of sodium thiosulfate and then again washed, and then further worked up in the usual manner.

(b) *Of upper leather, sole leather, etc.*

In addition to the superoxidized iron salts, as shown in Example 1—*a*, it is possible to add other mineral salts, as for example yellow chrome salts, potassium permanganate, titanium oxalate, picric acid, etc., as a result of which the leather will have the color and cut of vegetable-tanned leather. To carry out this process the skins or pelts must first be delimed. A solution made up as follows is then prepared:

| | Per cent |
|---|---|
| Salt (NaCl) | 2 |
| Aluminum sulfate | 3 |
| Potassium bichromate | 2 |
| Superoxidized iron salt | 6 to 8 | the strength depending somewhat upon the thickness of the skins. This solution is added to the tanning barrel or drum in three or four increments at intervals of from 20 to 30 minutes. The tanning solution should have a strength of about 8° to 10° Bé. The time of tanning for upper leathers and all types of fine and light leathers is from 3 to 4 hours. In this way there is obtained a thorough tanning of the material. Following the tanning, the leather is well washed in running water and then subjected to treatment in a 3% thiosulfate solution. Skins intended for the manufacture of sole leather are thoroughly swelled before tanning. The solution is the same as in the case of upper leathers, but in this case only about 20% of superoxidized iron salt is employed, and the strength of the tanning solution is increased to about 12° to 14° Bé. Because of the rapid tanning properties of the superoxidized iron salt, the tanning is completed in from 9 to 10 hours; but when it is done in pits, it requires about two days. Following the tanning, the skins are well washed, followed by treating with 1% of thiosulfate and then worked up in the usual way.

Ex. 2—For Bleaching and Mordanting Chrome Leather

The solution employed contains from 6% to 8% of the superoxidized iron salt, 2% of salt (NaCl), and 80% to 100% of water, all calculated upon the shaved weight of the skins. The skins are drummed with this solution, which is added in two portions at an interval of 30 minutes, for about 2 hours, at a temperature of from 85° to 95° F. The solution may advantageously be introduced into the drum through its hollow axle.

Ex. 3—For Retanning of Chrome Leather

The skins after having been shaved are deacidified by treatment with 4% of thiosulfate at from 70° to 80° F., whereafter they are rinsed in running water and then retanned with a solution containing 6% to 8% of superoxidized iron salt, 2% of salt (NaCl), and 80% to 100% of water, the solution being added in two increments at an interval of 30 minutes through the hollow axle of the tanning drum. The skins are drummed in the solution for about 2 or 3 hours, whereafter they are washed and then fat-liquored in the usual way with a sulfonated oil such as Turkey red oil.

Summing up, the principal features of the present invention reside in the use of the superoxidized basic ferric sulfate as a tanning agent in place of strongly acid solutions which have hitherto been used in this art.

I claim:

1. The process of converting ferrous sulfate into an efficient tanning agent which comprises heating ferrous sulfate with free access of atmospheric oxygen to a temperature of about 50° C. while irradiating the same with ultraviolet light.

2. A process of tanning which comprises subjecting tannable material to a solution of a reaction product obtained by reacting dehydrated ferrous sulfate and molecular oxygen in the presence of ultraviolet light.

3. A process of tanning which comprises preparing an aqueous solution of ferrous sulfate which has been irradiated with ultraviolet light in the presence of oxygen, and immersing the tannable material in said solution.

4. The process of tanning which comprises subjecting hides, skins, furs, and the like to the action of an aqueous solution containing an iron sulfate less acid than ferric sulfate but containing more oxygen than ferrous sulfate and having the probable formula $Fe_2S_2O_9$.

WILLY GÜNTHER.